US008680451B2

(12) United States Patent
Iwane

(10) Patent No.: US 8,680,451 B2
(45) Date of Patent: Mar. 25, 2014

(54) LIGHT RECEIVING DEVICE, FOCUS DETECTION DEVICE AND IMAGING DEVICE

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 815 days.

(21) Appl. No.: 12/674,856

(22) PCT Filed: Oct. 1, 2008

(86) PCT No.: PCT/JP2008/067842
§ 371 (c)(1),
(2), (4) Date: Feb. 23, 2010

(87) PCT Pub. No.: WO2009/044776
PCT Pub. Date: Apr. 9, 2009

(65) Prior Publication Data
US 2011/0019184 A1    Jan. 27, 2011

(30) Foreign Application Priority Data

Oct. 2, 2007   (JP) .................................. 2007-258787
Dec. 25, 2007  (JP) .................................. 2007-331854

(51) Int. Cl.
G02B 7/28      (2006.01)
G02B 7/34      (2006.01)
G03B 13/36     (2006.01)
H04N 5/232     (2006.01)

(52) U.S. Cl.
USPC .......... 250/206.1; 250/208.1; 396/81; 396/92

(58) Field of Classification Search
USPC ............ 250/208.1, 201.6; 396/79, 80, 81, 82, 396/87, 91, 92
See application file for complete search history.

(56) References Cited

U.S. PATENT DOCUMENTS

| 4,908,643 | A | 3/1990 | Tamada et al. |
| 4,914,464 | A | 4/1990 | Azuma et al. |
| 5,076,687 | A | 12/1991 | Adelson |
| 5,539,494 | A | 7/1996 | Uchiyama |

(Continued)

FOREIGN PATENT DOCUMENTS

| EP | 1 887 399 A1 | 2/2008 |
| JP | A-64-079711 | 3/1989 |

(Continued)

OTHER PUBLICATIONS

Extended Search Report issued in corresponding European Application No. 08836715.6 dated Feb. 25, 2011.

(Continued)

*Primary Examiner* — John Lee
(74) *Attorney, Agent, or Firm* — Oliff, PLC

(57) ABSTRACT

A light receiving device that receives light having passed through an image forming optical system and outputs a light reception signal includes: a light receiving element array formed by arraying a plurality of light receiving elements; a micro-lens array disposed between the image forming optical system and the light receiving element array, which includes a plurality of micro-lenses arrayed in correspondence to the plurality of light receiving elements; and a storage unit that stores position-related information pertaining to a relative positional relationship assumed by the micro-lens array and the light receiving element array with respect to a plane perpendicular to optical axes of the micro-lenses.

17 Claims, 12 Drawing Sheets

(56) References Cited

U.S. PATENT DOCUMENTS

| | | | |
|---|---|---|---|
| 5,682,203 A * | 10/1997 | Kato | 348/340 |
| 6,088,537 A | 7/2000 | Ohtaka et al. | |
| 6,933,978 B1 | 8/2005 | Suda | |
| 7,414,231 B2 * | 8/2008 | Fukui | 250/201.2 |
| 7,474,352 B2 * | 1/2009 | Oikawa | 348/349 |
| 7,488,923 B2 * | 2/2009 | Kusaka | 250/201.2 |
| 7,677,818 B2 * | 3/2010 | Akiyama et al. | 396/529 |
| 7,751,700 B2 * | 7/2010 | Kusaka | 396/79 |
| 7,792,420 B2 * | 9/2010 | Kusaka | 396/79 |
| 8,019,209 B2 * | 9/2011 | Nomura et al. | 396/55 |
| 8,098,984 B2 * | 1/2012 | Iwane | 396/121 |
| 2002/0039489 A1 | 4/2002 | Matsuda | |
| 2007/0102619 A1 | 5/2007 | Kusaka | |
| 2007/0206937 A1 | 9/2007 | Kusaka | |
| 2007/0206940 A1 | 9/2007 | Kusaka | |
| 2007/0252074 A1 | 11/2007 | Ng et al. | |
| 2008/0277566 A1 | 11/2008 | Utagawa | |
| 2011/0019184 A1 * | 1/2011 | Iwane | 356/123 |

FOREIGN PATENT DOCUMENTS

| | | |
|---|---|---|
| JP | A-01-201633 | 8/1989 |
| JP | A-06-130288 | 5/1994 |
| JP | A-8-220584 | 8/1996 |
| JP | A-10-020184 | 1/1998 |
| JP | A-2000-028892 | 1/2000 |
| JP | A-2001-124984 | 5/2001 |
| JP | A-2005-148091 | 6/2005 |
| JP | A-2006-030859 | 2/2006 |
| JP | A-2007-004471 | 1/2007 |
| JP | A-2007-011314 | 1/2007 |
| JP | A-2007-189312 | 7/2007 |
| JP | A-2007-233033 | 9/2007 |
| JP | A-2007-316521 | 12/2007 |
| JP | A-2009-175680 | 8/2009 |
| WO | WO 2006/039486 A2 | 4/2006 |

OTHER PUBLICATIONS

Ng et al., "Light Field Photography with a Hand-held Plenoptic Camera," Stanford University Computer Science Tech Report CTSR 2005-02, Apr. 2005, pp. 1-11.

International Search Report issued in Application No. PCT/JP2008/067842 on Dec. 16, 2008.

Nov. 28, 2011 Office Action issued in European Patent Application No. 08 836 715.6.

Oct. 11, 2012 Summons to Attend Oral Proceedings issued in European Patent Application No. 08836715.6.

Sep. 25, 2012 Office Action issued in Japanese Patent Application No. 2008-256399 (with translation).

Apr. 9, 2013 Office Action issued in Japanese Patent Application No. 2008-256399 (with translation).

Apr. 26, 2013 Office Action issued in European Patent Application No. 08836715.06.

Jan. 2, 2014 Search Report issued in European Patent Application No. 13175348.5.

* cited by examiner

LIGHT RECEIVING DEVICE, FOCUS DETECTION DEVICE AND IMAGING DEVICE

TECHNICAL FIELD

The present invention relates to a light receiving element, a focus detection device and an imaging device.

BACKGROUND ART

There is a focus detection device known in the related art that includes a micro-lens array disposed at a predetermined focal plane of an image forming optical system and a plurality of light receiving elements disposed in a linear pattern in correspondence to each micro-lens, creates a pair of signal value strings made up with signal values output from the light receiving elements disposed below the micro-lenses, which correspond to a pair of areas of the pupil of the image forming optical system, and detects the focusing condition at the image forming optical system by detecting the shift amount manifested by the pair of signal value strings (see patent literature 1).

Patent Literature 1: Japanese Laid Open Patent Publication No. 2007-11314

DISCLOSURE OF THE INVENTION

Problems to be Solved by the Invention

When manufacturing a focus detection device by layering an area sensor with light receiving elements arrayed in an orderly two-dimensional pattern and a micro-lens array one on top of the other, the center of each micro-lens and the center of a light receiving element corresponding to the micro-lens cannot easily be aligned with accuracy in the submicron order. Rather, since a stable positional relationship cannot be assured reliably for the micro-lens array and the area sensor, highly accurate focus detection cannot always be executed.

Means for Solving the Problems

According to the 1st aspect of the present invention, a light receiving device that receives light having passed through an image forming optical system and outputs a light reception signal comprises: a light receiving element array formed by arraying a plurality of light receiving elements; a micro-lens array disposed between the image forming optical system and the light receiving element array, which includes a plurality of micro-lenses arrayed in correspondence to the plurality of light receiving elements; and a storage unit that stores position-related information pertaining to a relative positional relationship assumed by the micro-lens array and the light receiving element array with respect to a plane perpendicular to optical axes of the micro-lenses.

According to the 2nd aspect of the present invention, in the light receiving device according to the 1st aspect, it is preferred that the position-related information relates to positions assumed by the optical axes of the micro-lenses on the light receiving element array.

According to the 3rd aspect of the present invention, in the light receiving device according to the 1st aspect, it is preferred that the position-related information indicates a relationship pertaining to the image forming optical system assuming a first pupil position, achieved between central positions of pupil images projected via the micro-lenses onto the light receiving element array and the first pupil position.

According to the 4th aspect of the present invention, in the light receiving device according to the 3rd aspect, it is preferred that the position-related information further indicates a relationship pertaining to the image forming optical system assuming a second pupil position different from the first pupil position, achieved between central positions of pupil images projected via the micro-lenses onto the light receiving element array and the second pupil position.

According to the 5th aspect of the present invention, in the light receiving device according to the 4th aspect, it is preferred that the position-related information is constituted with a set of data indicating the first pupil position and the central positions of the pupil images corresponding to the first pupil position.

According to the 6th aspect of the present invention, in the light receiving device according to the 4th aspect, it is preferred that the light receiving device further comprises: a position calculation unit that determines, based upon the position-related information, the central positions of pupil images corresponding to a given pupil position that may be assumed by the image forming optical system.

According to the 7th aspect of the present invention, in the light receiving device according to the 6th aspect, it is preferred that with (x1, y1) and (x2, y2) respectively representing central positions of the pupil images corresponding to the first pupil position h1 and the second pupil position h2 and h0 representing the given pupil position, the position calculation unit calculates a central position (x0, y0) representing each of the central positions of the pupil images corresponding to the given pupil position h0 expressed as;

$$x0=(x2-x1)\{h1\cdot h2/(h1-h2)\}\cdot(1/h0)+x2-(x2-x1)\{h1\cdot h2/(h1-h2)\}\cdot(1/h2)$$

$$y0=(y2-y1)\{h1\cdot h2/(h1-h2)\}\cdot(1/h0)+y2-(y2-y1)\{h1\cdot h2/(h1-h2)\}\cdot(1/h2)$$

According to the 8th aspect of the present invention, a focus detection device comprises: a light receiving device according to the 1st aspect; a selection unit that selects a group of light receiving elements from a plurality of light receiving elements corresponding to at least some of the plurality of micro-lenses by designating as a reference position a relative positional relationship, pertaining to a plane perpendicular to the optical axes of the micro-lenses, and achieved between the micro-lenses and the light receiving element array, which is determined based upon the position-related information for the at least some of the plurality of micro-lenses; and a focus detection calculation unit that detects a focusing condition of the image forming optical system based upon outputs from the group of light receiving elements having been selected by the selection unit.

According to the 9th aspect of the present invention, in the focus detection device according to the 8th aspect, it is preferred that the focus detection device further comprises: a normalization unit that normalizes, based upon the position-related information, the outputs from the group of light receiving elements having been selected by the selection unit, and that the focus detection calculation unit detects the focusing condition based upon the outputs having been normalized by the normalization unit.

According to the 10th aspect of the present invention, in the focus detection device according to the 9th aspect, it is preferred that the normalization unit normalizes the outputs of the group of light receiving elements having been selected by the selection unit based upon the position-related information through weighted averaging; and the focus detection calculation unit detects the focusing condition of the image forming optical system based upon the outputs having been normalized through the weighted averaging.

According to the 11th aspect of the present invention, in the focus detection device according to the 8th aspect, it is preferred that the group of light receiving elements having been selected by the selection unit includes at least two light receiving elements.

According to the 12th aspect of the present invention, in the focus detection device according to the 8th aspect, it is preferred that the selection unit selects as the group of light receiving elements a pair of light receiving element groups centered on the reference position as which a position of each of the optical axes of the micro-lenses assumed on the light receiving element array is designated.

According to the 13th aspect of the present invention, in the focus detection device according to the 12th aspect, it is preferred that the focus detection device further comprises: an ascertaining unit that ascertains a pupil position assumed by the image forming optical system; and a correction unit that corrects the position of the optical axis based upon the pupil position ascertained by the ascertaining unit.

According to the 14th aspect of the present invention, in the focus detection device according to the 11th aspect, it is preferred that the selection unit selects as the group of light receiving elements a pair of light receiving element groups centered on the reference position as which a central position of an image of a pupil of the image forming optical system, projected via each of the micro-lenses onto the light receiving element array, is designated.

According to the 15th aspect of the present invention, in the focus detection device according to the 12th or 14th aspect, that repeatedly detects the focusing condition by altering a distance between the pair of light receiving element groups.

According to the 16th aspect of the present invention, an imaging device comprises: a focus detection device according to any one of the 8th through 15th aspects; and an image sensor that receives a light flux from a subject and outputs an image signal, and the image forming optical system guides the light flux from the subject to the image sensor and the focus detection device.

According to the 17th aspect of the present invention, in the imaging device according to the 16th aspect, it is preferred that the image forming optical system includes a focusing lens and a lens drive device that drives the focusing lens along an optical axis of the image forming optical system based upon the focusing condition detected by the focus detection device.

According to the 18th aspect of the present invention, an imaging device comprises: a light receiving device according to the 1st aspect; and an image synthesis unit that synthesizes image data expressing an image at a given image plane assumed by the image forming optical system based upon outputs from some light receiving elements selected from the plurality of light receiving elements disposed in correspondence to each of the micro-lenses by designating as a reference position a relative positional relationship pertaining to a plane perpendicular to the optical axes of the micro-lenses and achieved between the micro-lenses and the light receiving array, which is determined for each micro-lens based upon the position-related information.

According to the 19th aspect of the present invention, in the imaging device according to the 18th aspect, it is preferred that the imaging device further comprises: a normalization unit that normalizes based upon the position-related information the outputs from the some light receiving elements hav-ing been selected, and that the image synthesis unit synthesizes the image data based upon the outputs having been normalized by the normalization unit.

ADVANTAGEOUS EFFECTS OF THE INVENTION

According to the present invention, focus detection can be executed with a high level of accuracy without requiring the micro-lens array and the area sensor to be aligned with exacting precision.

BEST MODE FOR CARRYING OUT THE INVENTION

Figure 1:
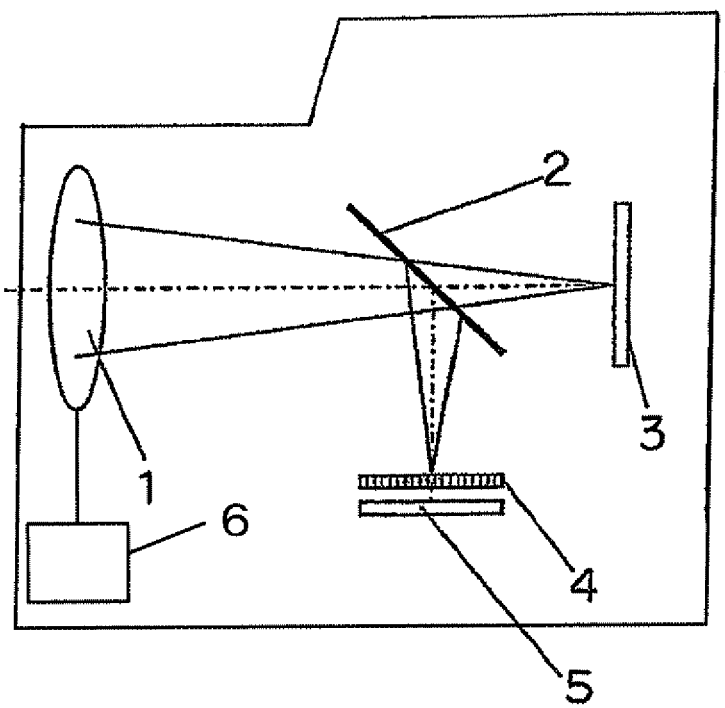
FIG. 1 A figure of the structure of an optical system in a camera equipped with the focus detection device achieved in an embodiment of the present invention.

The following is a description of the best mode for carrying out the present invention, given in reference to the drawings. FIG. 1 shows an embodiment of the focus detection device according to the present invention. The embodiment is described in reference to an example in which the focus detection device according to the present invention is adopted in a digital single lens reflex still camera. FIG. 1 shows the structure adopted in the optical system of the digital single lens reflex still camera.

A light flux originating from the subject and transmitted through an image forming optical system 1 is then transmitted through a half mirror 2 and is guided to an image sensor 3 disposed at a predetermined focal plane of the image forming optical system 1. A subject image is thus formed on the light receiving surface of the image sensor 3. The image sensor 3, equipped with imaging pixels disposed in a two-dimensional array, receives a light flux from the subject, with which an image is formed via the image forming optical system 1, and outputs image signals. It is to be noted that although the image forming optical system 1 is represented by a single lens in the illustration, the image forming optical system actually includes an objective lens, a zooming lens, a focusing lens, an aperture and a lens drive device 6.

Part of the light flux from the subject, having been transmitted through the image forming optical system 1, is reflected at the half mirror 2 and is guided to a micro-lens array 4. The micro-lens array 4 includes a plurality of micro-lenses disposed in a two-dimensional array. An area sensor 5 is disposed in correspondence to the micro-lens array 4, and the light flux, having originated from the subject and entered the micro-lens array 4, passes through the micro-lens array 4 and enters the area sensor 5.

The plane of the pupil of the image forming optical system 1 and the light receiving surface (predetermined focal plane) of the image sensor 3 assume an optically conjugate relation to the plane defined by the line connecting the vertices of the individual micro-lenses at the micro-lens array 4. The area sensor 5, which is a light receiving element array of a plurality of light receiving elements disposed in a two-dimensional array, is disposed at the focal plane of the micro-lenses at the micro-lens array 4. Based upon focus detection signals output from the light receiving elements at the area sensor 5, the extent of an offset of the position at which the image is formed via the image forming optical system 1, relative to the predetermined focal plane, is measured and focus adjustment for the image forming optical system 1 is executed based upon the measurement results.

Figure 2:
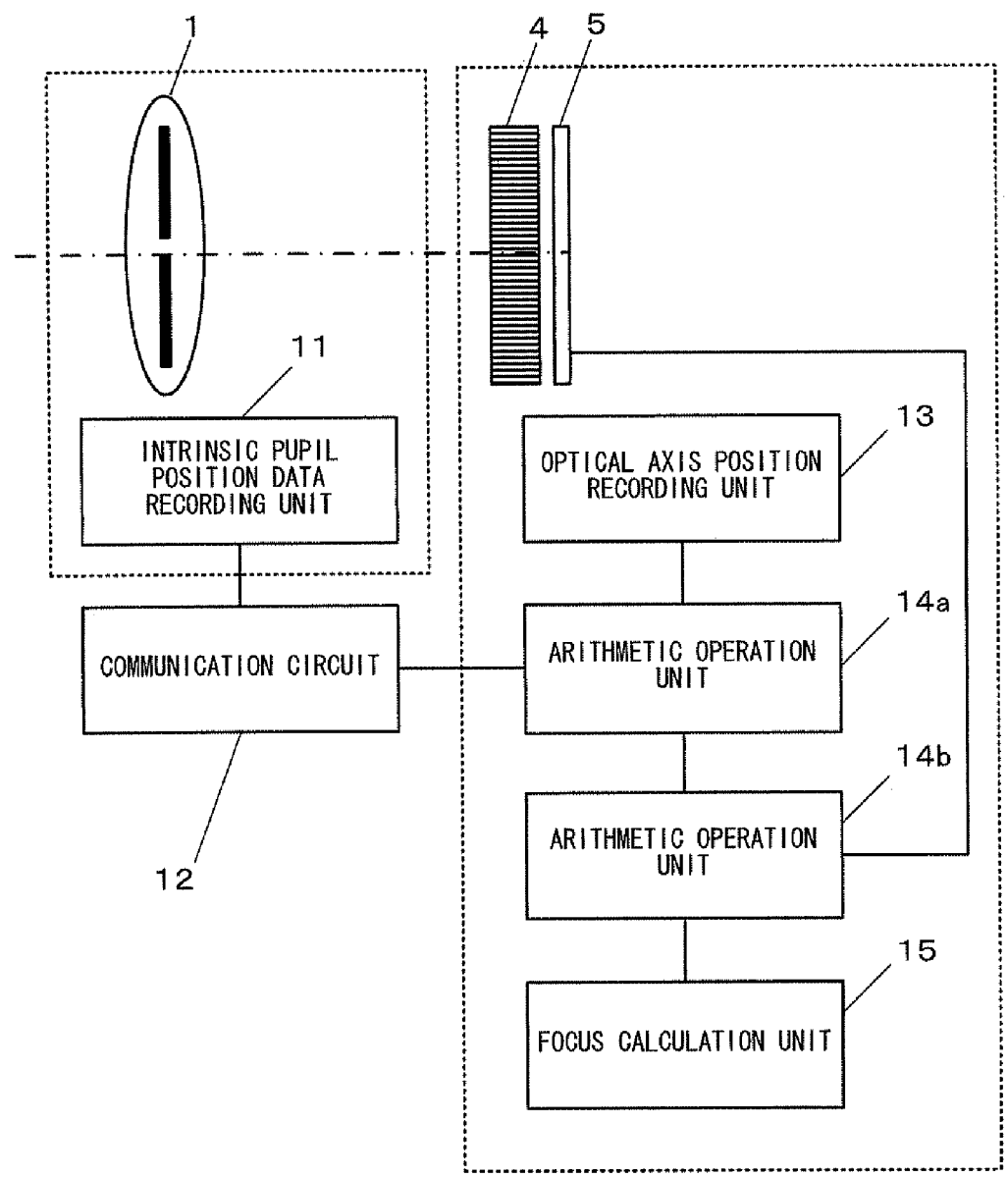
FIG. 2 A figure of the structure of the focus detection device.

FIG. 2 shows the structure of the focus detection device installed in the digital single lens reflex still camera shown in FIG. 1. The digital single lens reflex still camera is configured by mounting an interchangeable lens barrel, which includes the image forming optical system 1, at a body. The micro-lens array 4 and the area sensor 5 in FIG. 1 constitute part of the focus detection device. In an intrinsic pupil position data recording unit 11 constituted with a non-volatile memory, intrinsic pupil position data inherent to the image forming optical system 1 are recorded. A communication circuit 12 reads out pupil position data from the intrinsic pupil position data recording unit 11 and transmits the pupil position data thus read out to an arithmetic operation unit 14a within the body. In an optical axis position recording unit 13, reference positions, measured in advance for the specific lens mounted via the interchangeable lens barrel, are recorded each in correspondence to one of the micro-lenses constituting the micro-lens array 4. Such a reference position may be the position of the optical axis of the corresponding micro-lens as described later or a pupil center projection position to be described later.

Based upon the reference positions recorded in the optical axis position recording unit 13 and the intrinsic pupil position data pertaining to the image forming optical system 1 recorded in the intrinsic pupil position data recording unit 11, the arithmetic operation unit 14a calculates a reference position at a given image forming optical system 1 in correspondence to each micro-lens 4a. Based upon that reference positions having been calculated at an arithmetic operation unit 14a, the arithmetic operation unit 14b selects light receiving elements from which focus detection light reception data are to be obtained, among a plurality of light receiving elements, each corresponding to one of the micro-lenses and calculates parallax data to be detailed later. A focus calculation unit 15 executes focus detection calculation through a split-pupil phase difference AF (autofocus) method based upon the parallax data having been calculated by the calculation unit 14b. It is to be noted that the communication circuit 12 described above is not required in a configuration in which the focus detection device is installed in a camera with an integrated lens.

Figure 3:
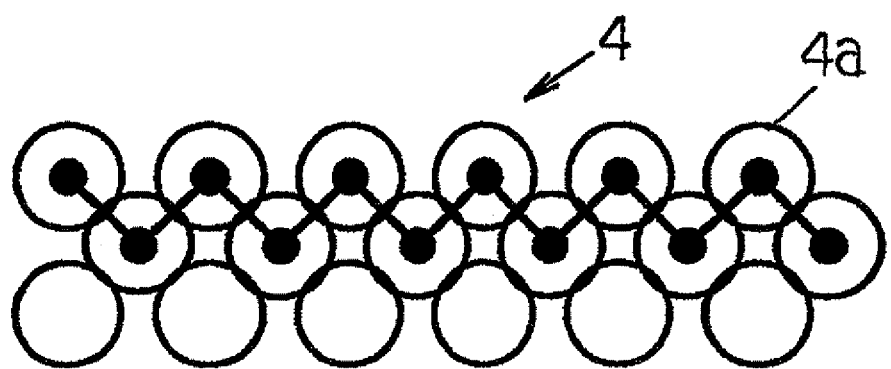
FIG. 3 A figure of the array pattern with which the micro-lenses are arrayed.

The micro-lens array 4 includes a plurality of micro-lenses 4a disposed in a staggered pattern, as shown in FIG. 3. The parallax data, based upon which the focusing condition at the image forming optical system 1 is ascertained, are obtained through calculation executed by selecting micro-lenses 4a in a zigzag pattern over two adjacent rows and using data output from light receiving elements 5a at the area sensor 5 corresponding to the selected micro-lenses 4a. The parallax data calculation is to be described in detail later.

Figure 4:
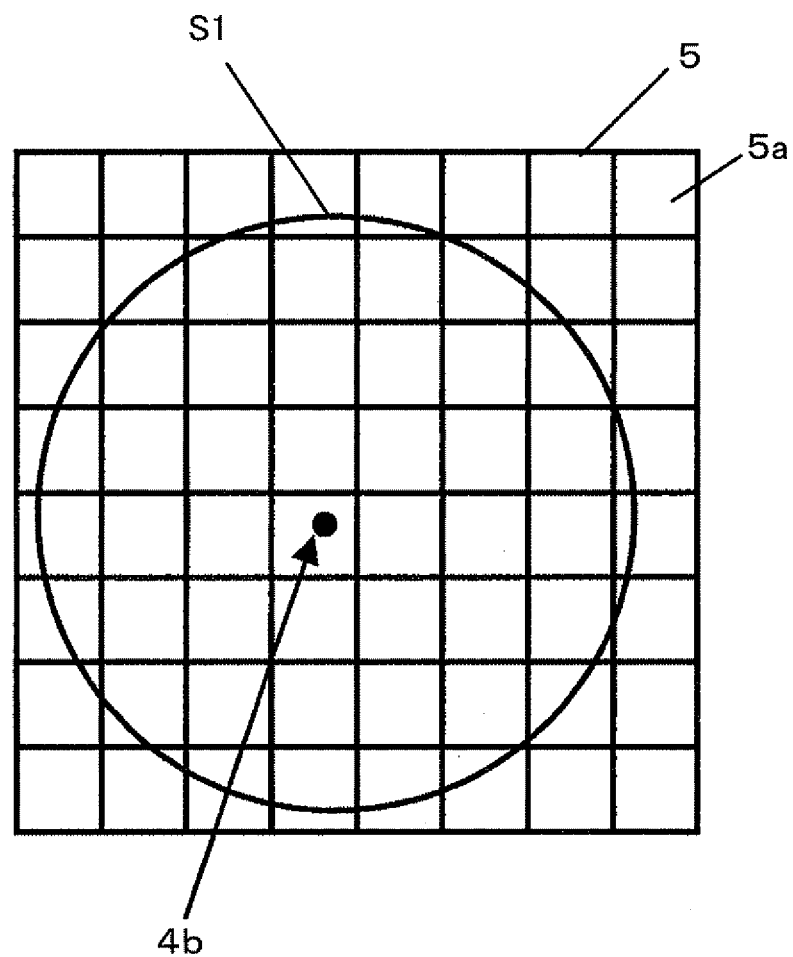
FIG. 4 A figure of the positional relationship between the micro-lens 4a and light receiving elements 5a at the area sensor 5.

FIG. 4 shows the relationship between a micro-lens 4a and light receiving elements 5a at the area sensor 5 in a plan view of a plane perpendicular to the normal passing through the vertex of the micro-lens 4a, i.e., perpendicular to the optical axis 4b of the micro-lens 4a. A circle S1 in FIG. 4 defines the shape of a shadow formed as the micro-lens 4a is projected onto the light receiving surface of the area sensor 5 along its optical axis 4b. The optical axis 4b of the micro-lens 4a and the center of a light receiving element 5a at the area sensor 5 cannot easily be set in perfect alignment relative to each other during the manufacturing process and rather, an offset such as that shown in FIG. 4 tends to occur in correspondence to the relative positional relationship of the micro-lens array 4 and the area sensor 5 in relation to a plane perpendicular to the optical axis 4b. In the example presented in FIG. 4, the optical axis 4b is offset to a right/upward position along a diagonal direction relative to the center of a light receiving element 5a. Since the quantity of micro-lenses 4a and the array pattern assumed for the micro-lenses 4a at the micro-lens array 4 are known, the position of the point at which the optical axis 4b of the micro-lens 4a and the light receiving element 5a intersect each other (the position of the optical axis 4b of the micro-lens 4a) can be determined based upon the available information.

The light receiving surface of the area sensor 5 assumes a position that is optically conjugate with the plane of the pupil of the image forming optical system 1 with respect to the micro-lens 4a, and an image of the pupil is projected onto the light receiving surface. As long as the optical axis 4b of the micro-lens 4a in FIG. 4 is aligned with the optical axis of the image forming optical system 1, the circle S1 defines an optically effective area of the micro-lens 4a. In such a case, the outputs from the individual light receiving elements 5a corresponding to the micro-lens 4a each indicate the intensity of a light flux having passed through a specific area of the pupil of the image forming optical system 1.

Assuming that the position of the optical axis 4b of the specific micro-lens 4a is designated as the reference position, the parallax data to be described later are obtained based upon the outputs from the light receiving elements 5a corresponding to the micro-lens 4a.

Figure 5:
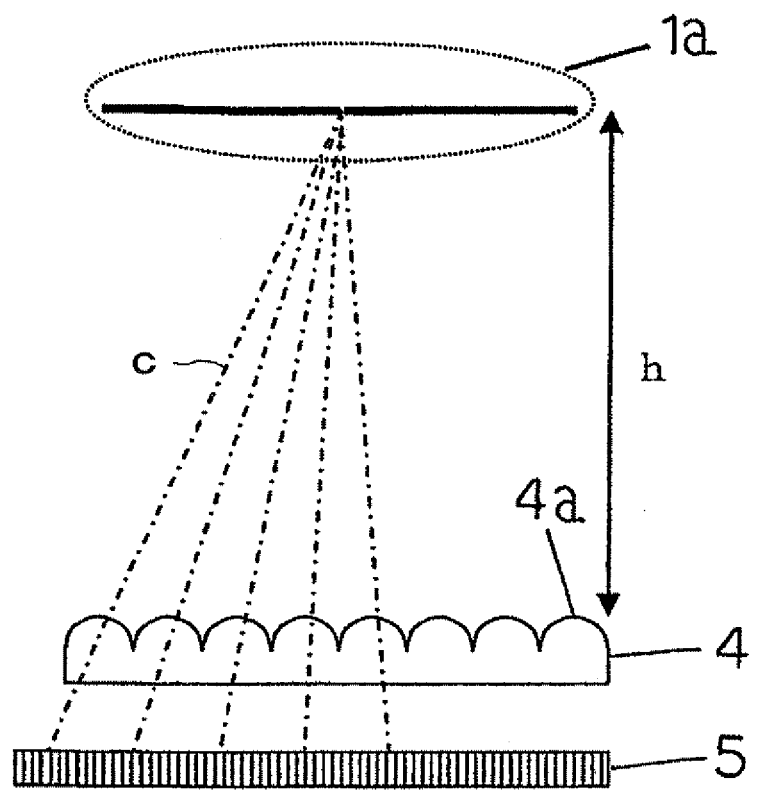
FIG. 5 A figure of the positional relationship of the pupil 1a of the image forming optical system 1 to the micro-lens array 4 and the area sensor 5.

FIG. 5 shows the relationship of the micro-lens array 4 and the area sensor 5 to the pupil 1a of the image forming optical system 1. The one-point chain lines C in FIG. 5 each connect the center of the pupil 1a with the vertex of a micro-lens 4a. In other words, the center of the pupil 1a is projected at the intersecting point at which the light receiving surface and each one-point chain line C intersect each other.

In reality, it is also difficult to manufacture the focus detection device by setting the optical axes 4b of the micro-lenses 4a in perfect alignment with the optical axis of the image forming optical system 1. Accordingly, even assuming that the optical axes 4b of the micro-lenses 4a are aligned with the centers of light receiving elements 5a, it cannot be reliably ensured that the center of the pupil 1a is projected onto the centers of the light receiving elements 5a. Furthermore, the position at which the center of the pupil 1a is projected is altered in correspondence to the distance (hereafter referred to as the pupil position) h to the pupil 1a from the plane formed with the vertices of the individual micro-lenses 4a.

It is desirable to slice out focus detection light reception data in reference to the coordinate values representing the intersecting point, in order to improve the accuracy of the focus detection. In the embodiment, the central position of an image of the pupil 1a projected onto the light receiving surface of the area sensor 5, i.e., a pupil center projection position, is calculated in correspondence to the pupil position h mentioned above and focus detection light reception data are sliced out based upon the calculation results. In the intrinsic pupil position data recording unit 11 shown in FIG. 2, data indicating the pupil position h shown in FIG. 5 or data based upon which the pupil position h can be calculated are recorded. The following description is given by assuming that the pupil position h is recorded.

Once the pupil position h is set to a specific value, the corresponding pupil center projection position is determined for each micro-lens 4a. In the optical axis position recording unit 13, a set of data made up with data indicating the pupil center projection positions for the individual micro-lenses 4a is recorded in correspondence to each of a plurality of pupil positions h. One of the plurality of pupil positions $h=h_1$, $h_2$, $h_3$, ... may represent infinity.

The coordinates indicating the pupil center projection positions are measured in correspondence to the individual micro-lenses 4a in conjunction with, for instance, two different image forming systems assuming pupil positions $h=h_1$ and $h=h_2$. $(x_1, y_1)$ represents the coordinates of the pupil center projection position measured when the pupil position h is $h_1$, whereas, $(x_2, y_2)$ represents the coordinates of the pupil center projection position measured when the pupil position h is $h_2$. The sets of data may be recorded, for instance, prior to factory shipment into the optical axis position recording unit 13 in correspondence to the pupil positions $h=h_1$ and $h=h_2$. A method that may be adopted when calculating the coordinates $(x_1, y_1)$, $(x_2, y_2)$ ... indicating the pupil center projection positions, to be recorded in the optical axis position recording unit 13, is to be described later.

The arithmetic operation unit 14a mentioned earlier calculates the pupil center projection position $(x_0, y_0)$ corresponding to the pupil position $h=h_0$ as expressed in (1) and (2) below, based upon the pupil position h recorded in the intrinsic pupil position data recording unit 11 for the image forming optical system 1 and the pupil center projection positions $(x_1, y_1)$ and $(x_2, y_2)$ recorded in the optical axis position recording unit 13. Based upon the hypothesis that $x_1$, $x_2$, and $x_0$ respectively assume linear relations to $1/h_1$, $1/h_2$ and $1/h_0$, $x_0$ relative to $1/h_0$ can be calculated as expressed in (1) based upon $x_1$, $x_2$, $1/h_1$ and $1/h_2$. Likewise, $y_0$ can be calculated as expressed in (2).

$$x_0 = (x_2 - x_1) \cdot \{h_1 \cdot h_2/(h_1 - h_2)\} \cdot (1/h_0) + x_2 - (x_2 - x_1) \cdot \{h_1 \cdot h_2/(h_1 - h_2)\} \cdot (1/h_2) \quad (1)$$

$$y_0 = (y_2 - y_1) \cdot \{h_1 \cdot h_2/(h_1 - h_2)\} \cdot (1/h_0) + y_2 - (y_2 - y_1) \cdot \{h_1 \cdot h_2/(h_1 - h_2)\} \cdot (1/h_2) \quad (2)$$

The granularity of the data indicating the pupil center projection positions must be smaller than the size of light receiving elements 5a. For instance, the size of a single light receiving element 5a may be greater than the sum of the dimensions of two adjacent micro-lenses 4a. Accordingly, it is desirable that the data indicating the pupil center projection positions be expressed with values, the number of digits thereof greater by two digits or the like than the number of digits in the coordinate values, which are integers indicating the positions of the light receiving elements 5a.

The method adopted when calculating the pupil center projection positions $(x_1, y_1)$ and $(x_2, y_2)$ corresponding to the known pupil positions $h=h_1$ and $h=h_2$, to be recorded as sets of data into the optical axis position recording unit 13, is now described. The coordinates $(x_1, y_1)$ and $(x_2, y_2)$ indicating the pupil center projection positions can be calculated based upon measurement data with greater ease when a greater aperture value, e.g., F22, is selected and thus the image of the projected pupil 1a is smaller.

A light flux departing an illuminated white diffusing surface is received at the light receiving elements 5a via the micro-lenses 4a and image data $I_1$ are obtained based upon the light reception data. As explained earlier, the light receiving surface of the area sensor 5 is conjugate with the pupil plane relative to the micro-lenses 4a and accordingly, the pupil image is projected onto the light receiving surface of the area sensor 5 and the corresponding image data are obtained.

For instance, when the aperture value setting is F22, the lens focal length is 100 mm, the pupil position $h=h_1=100$ mm and the focal length of the micro-lenses 4a is 100 μm, pupil images with a diameter of 4.5 μm, the number of which corresponds to the quantity of micro-lenses 4a, are projected onto the light receiving surface. The size of these pupil images is not much different from the size of pixels arrayed at a standard image sensor.

Next, image data $I_2$ are obtained in a similar manner under dark conditions by turning off the illumination on the diffusing surface. The output difference between the two types of image data $I_1$ and $I_2$ thus obtained constitutes image data I from which any influence of background noise such as noise attributable to the dark current is eliminated. The image data I include image data $P(x, y)$ output at a position indicated by the coordinates $(x, y)$.

For instance, when the pupil position h is $h_p$, the coordinates $(m, n)$ indicating the position of the optical axis 4b of a given micro-lens 4a may be designated as values hypothetically representing the coordinates $(x_{pm}, y_{pn})$ of the pupil center projection position. R represents the integer part of the value obtained by dividing the radius of the micro-lens 4a by the length of a side of a light receiving element 5a. The x coordinate of the position of the gravitational center of the pupil image projected onto the light receiving surface can be expressed as in (3) below.

$$x = \frac{\int x \cdot P(x, y) dx dy}{\int P(x, y) dx dy} \quad (3)$$

Figure 6:
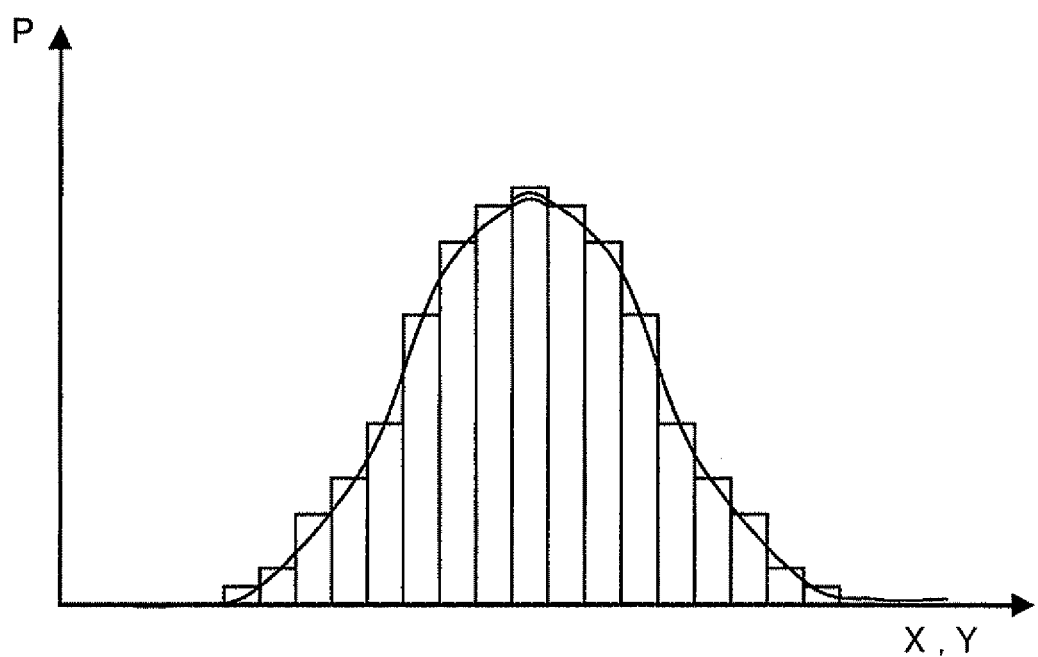
FIG. 6 A figure of a histogram of the signal values P indicated by the signals output from the light receiving elements.

The y-coordinate of the position of the gravitational center of the pupil image projected on the light receiving surface can likewise be expressed in a manner similar to that in (3) and the integrating operation is executed over a square area assuming a length 2R for each side and centered on the point indicated by the coordinates $(x_{pm}, y_{pn})$. Since the position of a light receiving element 5a is indicated by discrete coordinate values, the position of the gravitational center of the corresponding pupil image can be determined based upon a histogram pertaining to the outputs P from the light receiving elements 5a, such as that in FIG. 6. The coordinates ($x0_{pm}$, $y0_{pn}$) indicating the position of the gravitational center of the pupil image can be expressed as in (4) and (5) below.

$$x0_{pm} = \frac{\sum_{j=0}^{2R}\sum_{i=0}^{2R}(x_{pm}-R+i)\cdot P(x_{pm}-R+i, y_{pn}-R+j)}{\sum_{j=0}^{2R}\sum_{i=0}^{2R}P(x_{pm}-R+i, y_{pn}-R+j)} \quad (4)$$

$$y0_{pn} = \frac{\sum_{j=0}^{2R}\sum_{i=0}^{2R}(y_{pn}-R+j)P(x_{pm}-R+i, y_{pn}-R+j)}{\sum_{j=0}^{2R}\sum_{i=0}^{2R}P(x_{pm}-R+i, y_{pn}-R+j)} \quad (5)$$

The coordinates (m, n) initially used for substitution for the coordinates ($x_{pm}$, $y_{pn}$) of the pupil center projection position in expressions (4) and (5) are hypothetical coordinate values and their accuracy is uncertain. By designating the coordinates ($x0_{pm}$, $y0_{pn}$) of the position of the gravitational center of the pupil image calculated as expressed in (4) and (5), as new hypothetical coordinate values for the coordinates ($x_{pm}$, $y_{pn}$) of the pupil center projection position, the coordinates can be likewise expressed as in (6) and (7) below.

$$x1_{pm} = \frac{\sum_{j=0}^{2R}\sum_{i=0}^{2R}(x0_{pm}-R+i)\cdot P(x0_{pm}-R+i, y0_{pn}-R+j)}{\sum_{j=0}^{2R}\sum_{i=0}^{2R}P(x0_{pm}-R+i, y0_{pn}-R+j)} \quad (6)$$

$$y1_{pn} = \frac{\sum_{j=0}^{2R}\sum_{i=0}^{2R}(y0_{pn}-R+j)\cdot P(x0_{pm}-R+i, y0_{pn}-R+j)}{\sum_{j=0}^{2R}\sum_{i=0}^{2R}P(x0_{pm}-R+i, y0_{pn}-R+j)} \quad (7)$$

The newer coordinates ($x1_{pm}$, $y1_{pn}$) indicating the position of the gravitational center of the pupil image are more reliable than ($x0_{pm}$, $y0_{pn}$). While ($x_{pm}$, $y_{pn}$)=$y1_{pn}$) can be used as the values indicating the coordinates of the pupil center projection position under normal circumstances, a similar arithmetic operation may be executed repeatedly t times, or such an arithmetic operation may be repeatedly executed until the difference between the coordinate values calculated through the $t^{th}$ arithmetic operation and the coordinate values calculated through the $(t+1)^{th}$ arithmetic operation becomes less that a predetermined value. The final coordinate values indicating the position of the gravitational center of the pupil image thus calculated are then designated as the coordinates ($x_{pm}$, $y_{pn}$) of the pupil center projection position. Coordinates ($x_{1m}$, $y_{1n}$) are calculated to indicate the pupil center projection position for the micro-lens 4a occupying the position indicated by the coordinates (m, n) in correspondence to the pupil position h=$h_1$, whereas coordinates ($x_{2m}$, $y_{2n}$) are calculated to indicate the pupil center projection position for the micro-lens 4a occupying the position indicated by the coordinates (m, n) in correspondence to the pupil position h=$h_2$.

Sets of data {$x_1$, $y_1$} and {$x_2$, $y_2$} corresponding to the pupil positions h=$h_1$ and h=$h_2$, obtained by calculating the pupil center projection position coordinates for all the micro-lenses 4a as described above, are recorded into the optical axis position recording unit 13. Then, based upon the pupil positions h=$h_1$ and h=$h_2$ and the sets of data {$x_1$, $y_1$} and {$x_2$, $y_2$}, the pupil center projection position ($x_0$, $y_0$) for each micro-lens 4a can be calculated as expressed in (1) and (2) in conjunction with a lens assuming the pupil position h.

A pair of sets of focus detection light reception data are sliced out by selecting a pair of pixels or a pair of pixel groups set apart from each other over a predetermined distance along the left/right (horizontal) direction, the up/down (vertical) direction or a diagonal direction, relative to a pupil center projection position having been sliced out as described above or the position of the optical axis 4b of a micro-lens 4a. Based upon the pair of sets of focus detection light reception data having been sliced out at the two positions, parallax data are obtained. As is to be described in reference to FIG. 7, either of the pair of positions 7b and 7b' set apart from a pupil center projection position 7a over a predetermined distance, is not necessarily aligned with the center of a light receiving element 5a and accordingly, normalized outputs are calculated through proportional distribution based upon the outputs from adjacent light receiving elements 5a. While the following description is given by assuming that the reference position is the pupil center projection position 7a, the same principle applies when the reference position is represented by the position of the optical axis 4b of the micro-lens 4a.

Figure 7:
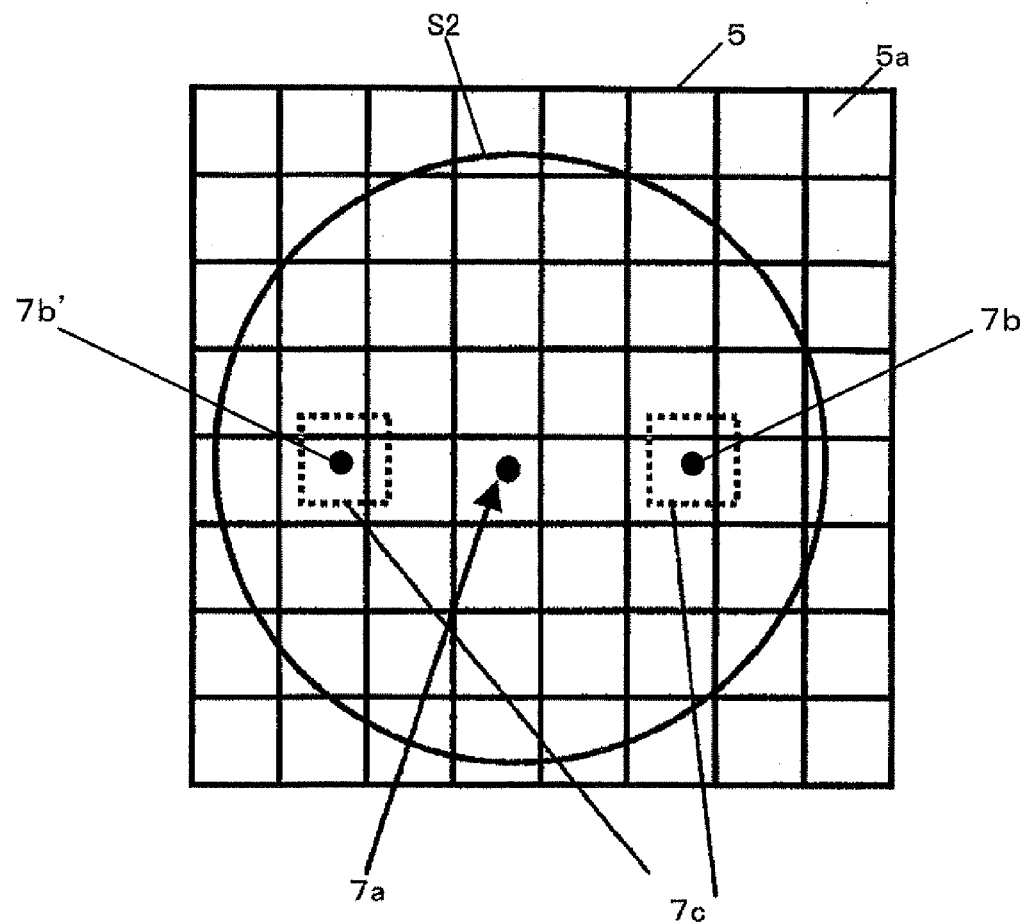
FIG. 7 An illustration of parallax data extraction target areas.

FIG. 7 illustrates how parallax data may be extracted. A circle S2 in FIG. 7 indicates an optically effective area of the micro-lens 4a and the light receiving elements 5a present within the circle S2 are covered with the micro-lens 4a. The outputs from the light receiving elements 5a present within the circle S2 each indicate the intensity of a light flux having passed through a given area of the pupil of the image forming optical system 1. A pair of areas 7c from which parallax data are to be sliced out are set at the pair of positions 7b and 7b' assuming left/right symmetry related to the pupil center projection position 7a. FIG. 7 shows areas 7c assuming an areal size matching that of the light receiving elements 5a, respectively centered on the positions 7b and 7b' set apart from the pupil center projection position 7a over a predetermined distance, e.g., a distance corresponding to two light receiving elements 5a.

($x_0$, $y_0$) represents the coordinates of the pupil center projection position 7a, ($x_0$+d, $y_0$) represents the coordinates of the center 7b of the area 7c present to the right of the pupil center projection position 7a and ($x_0$−d, $y_0$) represents the coordinates of the center 7b' of the area 7c present to the left of the pupil center projection position 7a. As shown in FIG. 7, if the pupil center projection position 7a does not match the center of a light receiving element 5a, the pair of positions 7b and 7b' assuming left/right symmetry with respect to the pupil center projection position are not aligned with the centers of light receiving elements 5a, either.

Figure 8:
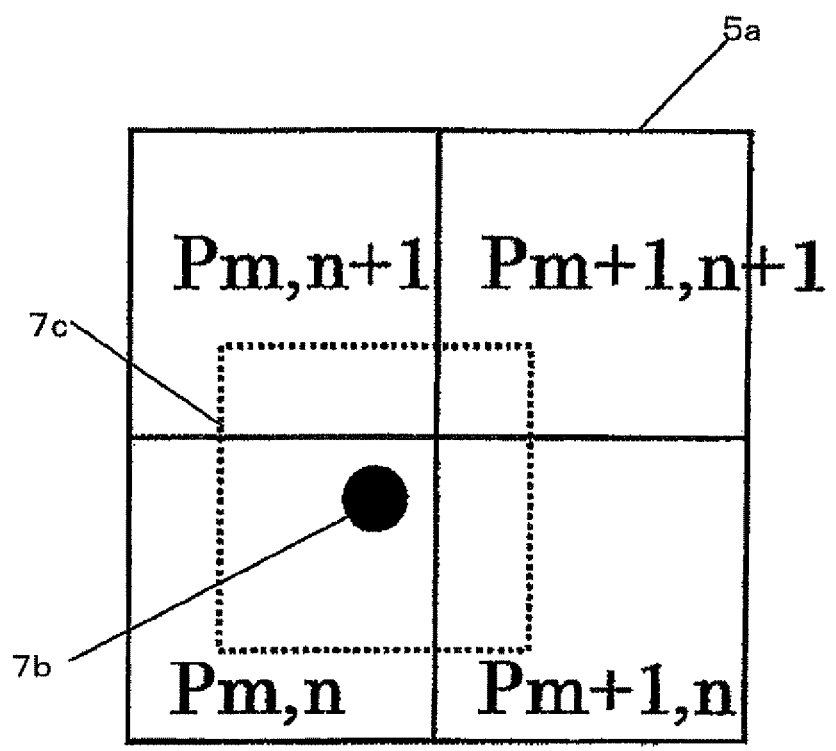
FIG. 8 An illustration of signal values P indicated by the signals output from an extraction target area.

A description is given in reference to FIG. 8 by focusing on the area 7c present to the right, the center thereof occupying the position indicated by the coordinates ($x_0$+d, $y_0$). Assuming m=[$x_0$+d] and n=[$y_0$] ([ ] indicating an integer), the coordinates indicating the positions of the light receiving elements 5a present in the area 7c are (m, n), (m+1, n), (m, n+1) and (m+1, n+1).

X=$x_0$+d and Y=$y_0$ represent the coordinates of the position of the center of the area 7c. An output P from the area 7c is calculated through proportional distribution of the outputs $P_{m,n}$, $P_{n+1,n}$, $p_{m,n+1}$ and $P_{m+1,n+1}$ corresponding to the plurality of light receiving elements 5a (a light receiving element group) present in the area 7c as shown in FIG. 8. Through horizontal proportional distribution of $P_{m,n}$, and $P_{m+1,n}$, P' is calculated as expressed in (8), whereas through horizontal proportional distribution of $P_{m,\,n+1}$ and $P_{m+1,\,n+1}$, P" is calculated as expressed in (9). Then, the normalized output P is calculated for the area $7c$ through vertical proportional distribution of P' and P" executed as expressed in (10) below.

$$P'=(X-m)\cdot P_{m+1,n}+(1-X+m)\cdot P_{m,n} \quad (8)$$

$$P''=(X-m)\cdot P_{m+1,n-1}+(1-X+m)\cdot P_{m,n+1} \quad (9)$$

$$P=(Y-n)\cdot P''+(1-Y+n)\cdot P' \quad (10)$$

The output P is the output from the right-hand side area $7c$ in FIG. 7. The output of the left-hand side area $7c$ can also be calculated through a similar arithmetic operation. The outputs of areas $7c$ set along the vertical direction relative to the pupil center projection position $7a$ can also be calculated through a similar arithmetic operation.

Through the operation described above, parallax data are calculated for the positions $7b$ and $7b'$ offset to the left and to the right relative to the pupil center projection position $7a$ in correspondence to a single micro-lens $4a$. Similar arithmetic operations are executed for w micro-lenses $4a$ arrayed along the baseline. The batch of parallax data calculated for positions offset to the left is used as a left data string and the batch of parallax data calculated for positions offset to the right is used as a right data string. If the micro-lenses $4a$ are disposed in a staggered array, as shown in FIG. 3, optimal micro-lenses $4a$ should be selected so as to obtain through calculation parallax data in correspondence to positions offset to the left and to the right relative to the selected micro-lenses. The left data string and the right data string thus obtained are respectively referred to as a data string A and a data string B, with each set of parallax data in the data string A indicated as $a_j$ and each set of parallax data in the data string B indicated as $b_j$ (j=1, ..., w).

The extent of offset of the focal point from the predetermined focal plane is reflected in the parallax data. Namely, the curves individually plotted based upon the left and right data strings calculated in correspondence to the w micro-lenses $4a$ manifest a shift between the data string A and the data string B by the extent of which corresponds to the parallax. On the premise that the left data string and the right data string are obtained based upon substantially similar projection image data, the shift quantity indicating the extent of shift manifested by the phases of the left and right data strings is determined through the focus detection calculation.

The focus detection calculation executed by the focus calculation unit 15 shown in FIG. 2 is now described. In the focus detection calculation, the difference between the data string A and the data string B is calculated while shifting the phases of the two data strings A and B and the shift amount indicating the extent of shift between the phases when the difference is at its smallest is determined. Namely, the shift amount k at which the defocus amount $D_k$ is at its smallest is determined by altering the shift amount k as expressed in (11) below, $$D_k = \sum_j |a_{j+k} - b_j| \quad (11)$$

The defocus amount $D_k$ calculated as expressed in (11) assumes discrete values and its minimum value cannot be determined with a resolution the level of which is equal to or less than the intervals over which the micro-lenses $4a$ are disposed. Since the outputs of the data strings A and B are obtained as a composition of sine wave signals, $D_k$ calculated as expressed in (11) can be modified to represent $D(\theta)$ in expression (12) with $\theta$ representing the phase difference $\theta$ equivalent to the phase shift amount k by focusing on sine wave signals corresponding to a given spatial frequency $\omega$ among these sine wave signals. Expression (12) can be rewritten as expression (13).

$$D(\theta)=K\!\int|\sin(\omega x+\theta)-\sin \omega x|dx \quad (12)$$

$$D(\theta)=K'|\sin(\theta/2)\cdot\cos(2\omega x/2+\phi/2)| \quad (13)$$

Figure 9:
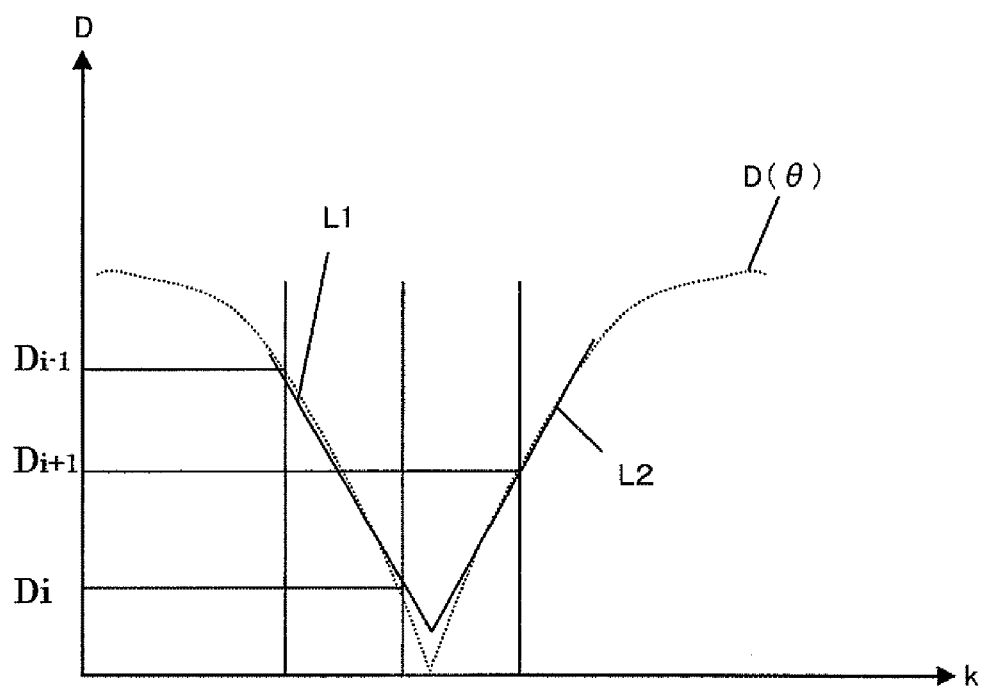
FIG. 9 A figure of the relationship of the defocus amount Dk indicating the extent of defocusing relative to the shift amount k indicating an extent of shift manifested by the pair of signal value strings.

$D(\theta)$ calculated as expressed in (13) changes in correspondence to the absolute value of the sine wave as indicated in FIG. 9. $D(\theta)$ can be calculated in a similar manner when the spatial frequency $\omega$ assumes another value. Through approximation, the defocus amount can be considered to assume the smallest value at the intersecting point of straight lines L1 and L2 described below, sloping with left-right symmetry, as shown in FIG. 9.

The smallest value $D_{min}$ of the defocus quantity can be calculated as follows. The smallest value of $D_k$ expressed in (11) and the corresponding phase shift quantity k are determined. In the example presented in FIG. 9, $D_i$ corresponding to k=i is the smallest value assumed for $D_k$. The larger value of the two values $D_{i-1}$ and $D_{i+1}$, closest to the smallest value $D_i$ assumed for $D_k$, is selected and the corresponding phase shift quantity k is also selected. In the example presented in FIG. 9, $D_{i-1}$ corresponding to k=i−1 is selected. Then, the straight line L1 passing through two points indicated as (k, D)=(i, $D_i$) and (k, D)=(i−1, $D_{i-1}$) is drawn. Next, a straight line L2 passing through a point (k, D)=(i+1, $D_{i+1}$), assuming a grade matching that of the straight line obtained by inverting the straight line L1 relative to the vertical coordinate axis, is drawn. Then, the intersecting point of the two straight lines L1 and L2 is determined and the value of D assumed at this intersecting point is designated as the minimum value $D_{min}$. Through this operation, the position of the focal point can be calculated based upon the outputs from the light receiving elements $5a$ in conjunction with the micro-lens array 4.

In the embodiment described above, the area sensor 5 with a plurality of light receiving elements $5a$ uniformly arrayed in correspondence to each micro-lens $4a$ is utilized and thus, the length of the baseline, extending along the left/right (horizontal) direction, the up/down (vertical) direction or a diagonal direction, can be adjusted. This feature will be extremely useful during focusing operation. Generally speaking, while the dynamic range of the focus detection can be increased by assuming a shorter baseline, the shorter baseline reduces the accuracy of the focus detection, whereas a longer baseline, which will improve the focus detection accuracy, will reduce the dynamic range of the focus detection.

Under normal circumstances, focus detection operation in a camera is executed by calculating the state of focus adjustment and driving the focusing lens multiple times until the focusing lens is driven to the focusing position rather than through a single calculation of the state of focus adjustment and a single focus adjustment drive. Thus, provided that the baseline length is adjustable, a wide dynamic range can be assured by setting a smaller baseline length during the initial stage of the focus detection operation and then better accuracy can be assured as the focusing lens approaches the focusing position by gradually increasing the baseline length. In other words, a focus detection operation which ensures both high accuracy and a wide dynamic range can be executed.

As has been described, in the digital single lens reflex still camera that executes split-pupil phase difference AF by engaging the focus detection device in the embodiment constituted with the micro-lens array 4 and the area sensor 5, data indicating the reference positions, i.e., the positions of the optical axes 4b of the individual micro-lenses 4a or the pupil center projection positions 7a corresponding to the individual micro-lenses 4a, are stored in advance in the optical axis position recording unit 13 within the body, a reference position is calculated for each micro-lens 4a in correspondence to a given pupil position based upon the pupil position data recorded in the intrinsic pupil position data storage unit 11 and the reference position data, and parallax data are obtained based upon the reference position thus calculated. As a result, better focus detection accuracy is assured. Since the micro-lens array 4 and the area sensor 5 do not need to be positioned with exacting precision, the focus detection device can be assembled with better ease.

In the embodiment described above, a pair of light receiving elements is selected in correspondence to each micro-lens 4a among the plurality of light receiving elements 5a at the area sensor 5 and the focusing condition of the optical system is determined through arithmetic operation executed based upon the outputs from the groups of light receiving elements selected in correspondence to a plurality of micro-lenses 4a. Thus, when adopted in a configuration with numerous light receiving elements 5a disposed in correspondence to each micro-lens 4a, light receiving elements 5a can be selected with a high level of freedom and also, since the sums of outputs from a plurality of light receiving elements 5a can be used in the focus detection calculation, the focus detection accuracy is improved.

In the embodiment described above, position (pupil position) data, indicating the position of the pupil of the optical system assured along the optical axis, and the corresponding pupil center projection position data are recorded and the necessary pupil center projection position data are generated through interpolation executed based upon the pupil position data and the pupil center projection position data. As a result, a high level of focus detection accuracy can be maintained in conjunction with lenses having different specifications and different characteristics, e.g., varying focal lengths.

While an explanation is given above in reference to the embodiment on an example in which the positions of the optical axes 46 of all the micro-lenses 4a at the micro-lens array 4 are recorded, the positions of the optical axes 4b of only some of the micro-lenses 4a may be recorded and, in such a case, the positions of the optical axes 4b of the other micro-lenses 4a may be determined through interpolation. For instance, the positions of the optical axes 4b of micro-lenses 4a present over predetermined intervals may be stored and the positions of the optical axes 4b of the micro-lenses 4a present in between may each be determined through interpolation executed based upon the positions of the optical axes 4b of the micro-lenses 4a adjacent on the left and right sides. In addition, the projection center position 7a does not need to be recorded in correspondence to each micro-lens 4a, either and, instead, only some projection center positions 7a may be recorded. In the latter case, the remaining projection center positions 7a can be determined through interpolation.

In the embodiment described above, parallax data are obtained through arithmetic operation by proportionally distributing the outputs from the light receiving elements 5a selected in correspondence to the individual micro-lenses 4a and the focusing condition of the image forming optical system 1 is calculated based upon the parallax data, assuring improved focus detection accuracy.

While a description is given above in reference to the embodiment on an example in which the present invention is adopted in conjunction with a micro-lens array 4 made up with a plurality of micro-lenses 4a arrayed in an orderly two-dimensional pattern and an area sensor 5 made up with a plurality of light receiving elements 5a disposed in an orderly two-dimensional pattern, the present invention may be adopted to achieve advantages comparable to those described above in a focus detection device constituted with a micro-lens array 4 made up with a plurality of micro-lenses 4a disposed in a single orderly row and an area sensor 5 made up with a plurality of light receiving elements 5a disposed in a single orderly row.

While the area sensor 5 having been described in reference to the embodiment, which includes focus detection light receiving elements 5a that output focus detection light reception data disposed in a two-dimensional array, is used exclusively for focus detection, the present invention may also be adopted in an image sensor engaged in both imaging operation and focus detection operation, which includes focus detection light receiving elements 5a disposed in a single row or a plurality of rows amidst a two-dimensional array of imaging light receiving elements.

While the focus detection is executed based upon the outputs from the light receiving elements 5a disposed in correspondence to each micro-lens 4a, an image may be generated by using these outputs as well. Based upon the image thus generated, a person's face may be detected so as to select a focus detection area corresponding to the person's face among a plurality of focus detection areas or based upon the image, the photographic scene may be analyzed so as to execute the optimal processing corresponding to the scene.

A specific range within the image generated as described above may be set as a focus detection area and the focusing condition may be detected based upon the outputs from the light receiving elements 5a corresponding to the micro-lenses 4a present within the focus detection area. Such a specific range within the image, to be set as a focus detection area, may be, for example, an area corresponding to a characteristic area detected in the image, an area in the vicinity of a preselected focus detection position or an area set at a position where the contrast of the image is detected to be equal to or greater than a predetermined value.

As explained above, an image may be generated by using the outputs from the light receiving elements 5a corresponding to the individual micro-lenses 4a and thus, the area sensor 5 equipped with the micro-lens array 4 can also function as an image sensor in an imaging device that synthesizes an image (see, for instance, Japanese Laid Open Patent Publication No, 2007-4471). Through the present invention, which may be adopted in an image sensor in an imaging device that synthesizes images as described above, improved image synthesis accuracy can be assured by determining the reference positions for the various micro-lenses 4a as explained earlier. The imaging device that synthesizes images may be, for instance, a plenoptic camera or an image synthesizing camera.

Figure 10:
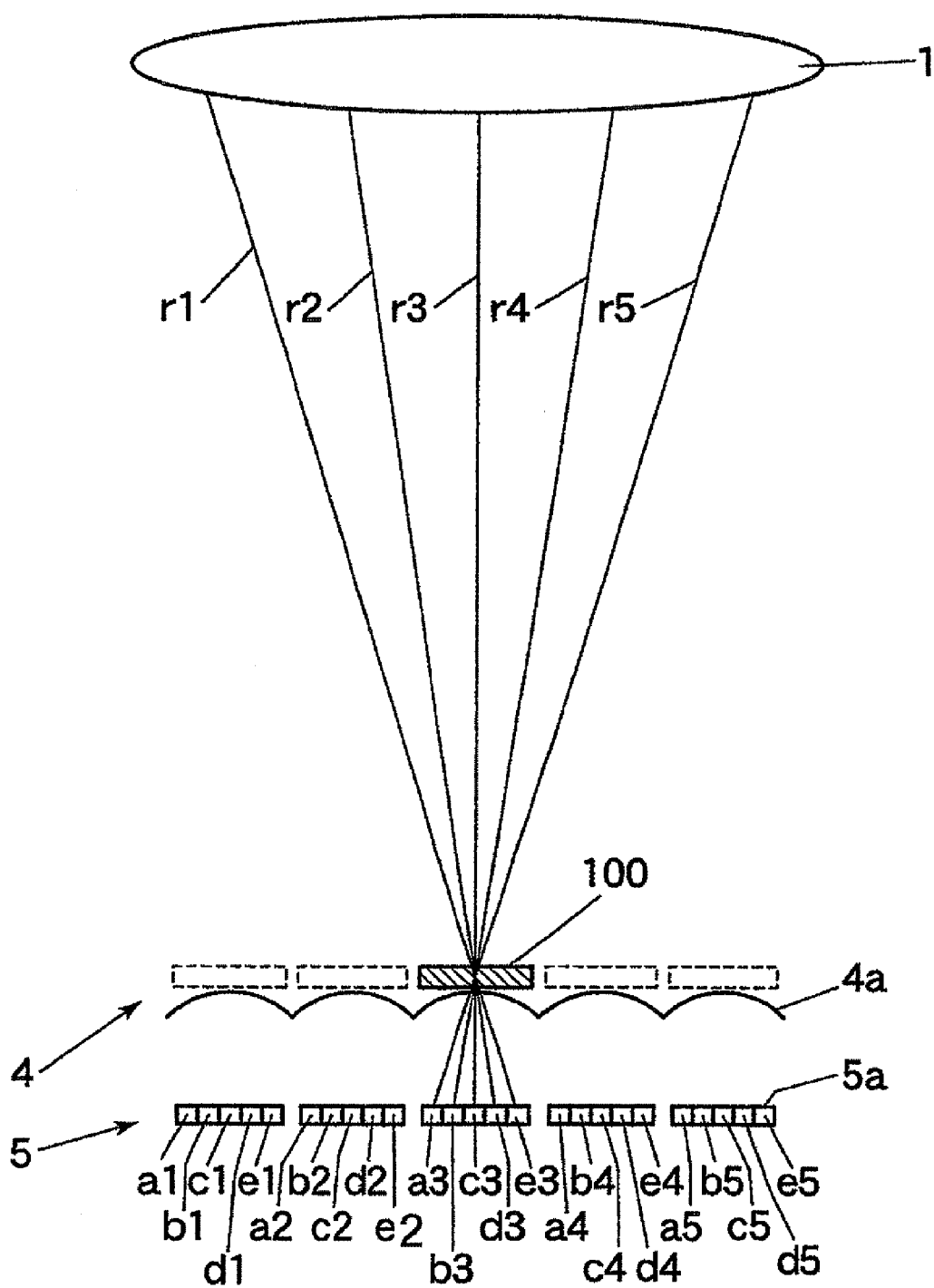
FIG. 10 An illustration of a method of photographic operation executed by using the signal values from the light receiving elements in an area sensor equipped with a micro-lens array when the position of a specified image plane is expressed as; Z=0.
Figure 11:
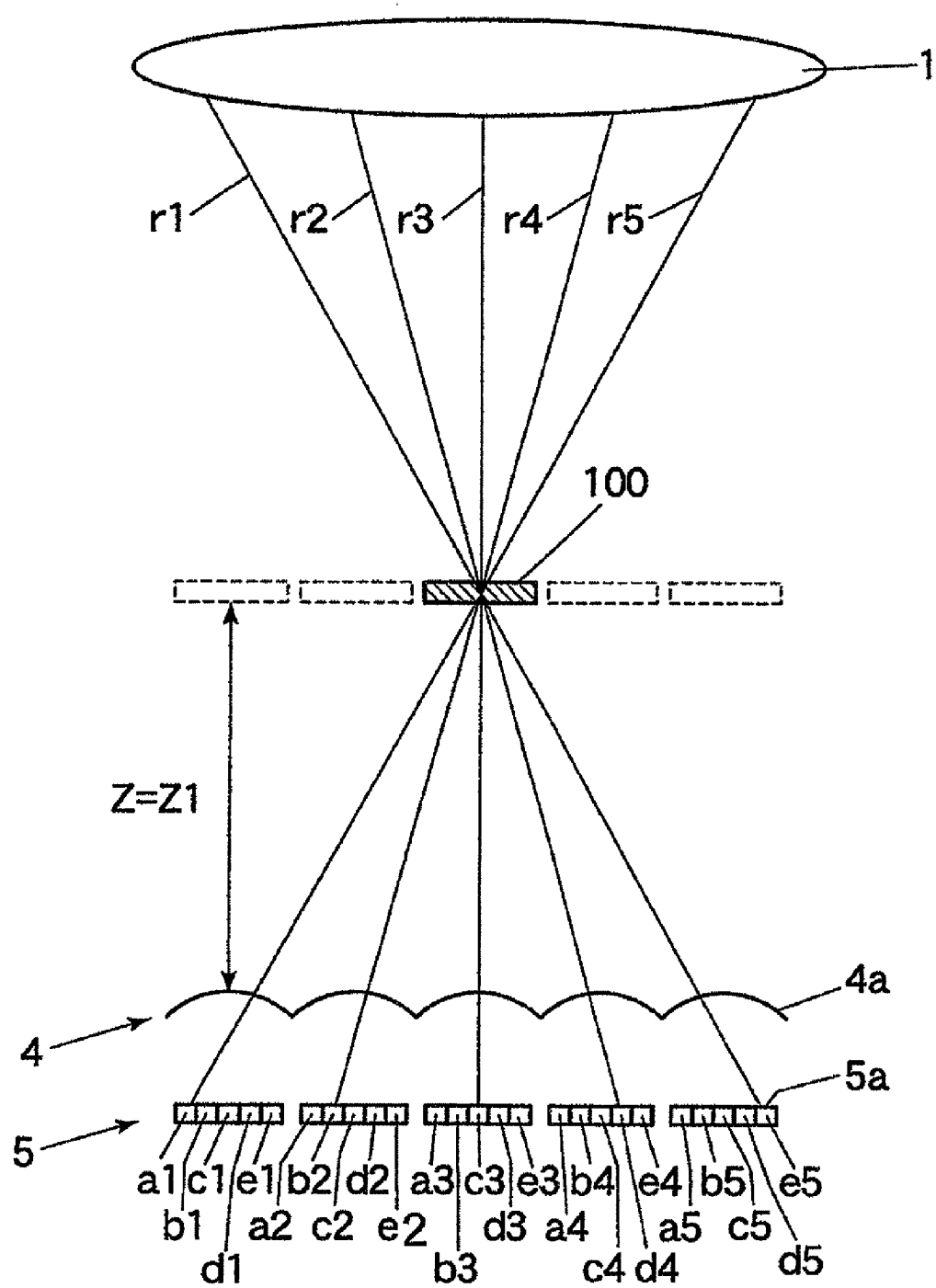
FIG. 11 An illustration of a method of photographic operation executed by using the signal values from the light receiving elements in an area sensor equipped with a micro-lens array when the position of a specified image plane is expressed as; Z=Z1.

In image synthesis operation, a given image plane of the image forming optical system 1 is designated as a specified image plane and image data expressing an image on the specified image plane are synthesized based upon the outputs from the individual light receiving elements 5a. FIGS. 10 and 11 illustrates how images may be synthesized by using light reception data from the area sensor 5 in conjunction with the micro-lens array 4. FIG. 10 illustrates a method that may be adopted when synthesizing an image in conjunction with the specified image plane assuming a position expressed as Z=0, whereas FIG. 11 illustrates a method that may be adopted when synthesizing an image in conjunction with the specified image plane assuming a position expressed as Z=Z1. Z indicates the height measured from the vertices of the micro-lenses 4a to the specified image plane. In FIGS. 10 and 11, the smallest units of image data resulting from the synthesis, referred to as virtual pixels, are indicated by the dotted lines. The width of the virtual pixels matches the pitch at which the micro-lenses 4a are disposed.

Light rays r1, r2, r3, r4 and r5 depart from different pupil areas of the image forming optical system 1. The light rays r1, r2, r3, r4 and r5 form an image at a virtual pixel 100 and then enter light receiving elements 5a via the corresponding micro-lens 4a. In the example presented in FIG. 10, the position of the virtual pixel 100 at which the image is formed is aligned with the plane ranging along a line connecting the vertices of the individual micro-lenses 4a, and the light rays r1, r2, r3, r4 and r5 respectively enter light receiving elements a3, b3, c3, d3 and e3 covered by the particular micro-lens 4a. Image data corresponding to the virtual pixel 100 at the specified image plane assuming the position Z=0 can be obtained as the sum of the outputs from the light receiving elements a3, b3, e3, d3 and e3. Image data corresponding to other virtual pixels can likewise be obtained, each as the sum of the outputs of the light receiving elements covered by the corresponding micro-lens 4a. With these image data, image data expressing an image formed at the specified image plane assuming the position Z=0 are synthesized.

In the example presented in FIG. 11, the light rays r1, r2, r3, r4 and r5 form an image at a virtual pixel 100 at the specified image plane assuming the position Z=Z1 and then enter, via different micro-lenses 4a, light receiving elements a1, b2, c3, d4 and e5 covered by these micro-lenses 4a. Image data corresponding to the virtual pixel 100 at the specified image plane assuming the position Z=Z1 can be obtained as the sum of the outputs from the light receiving elements a1, b2, c3, d4 and e5. By executing similar processing for each virtual pixel, image data expressing an image formed at the specified image plane assuming the position Z=Z1 are synthesized.

While image data are obtained by taking the sum of the outputs from five light receiving elements, i.e., the light receiving elements a3, b3, c3, d3 and e3 or the light receiving elements a1, b2, c3, d4 and e5, disposed along a single direction in the description provided above, it is necessary in reality to take the sum of the outputs from a total of 25, i.e., 5 (across)×5 (down), light receiving elements in order to obtain image data on an image plane. The example presented in FIG. 10 is further elaborated in reference to FIG. 12 based upon this concept.

Figure 12:
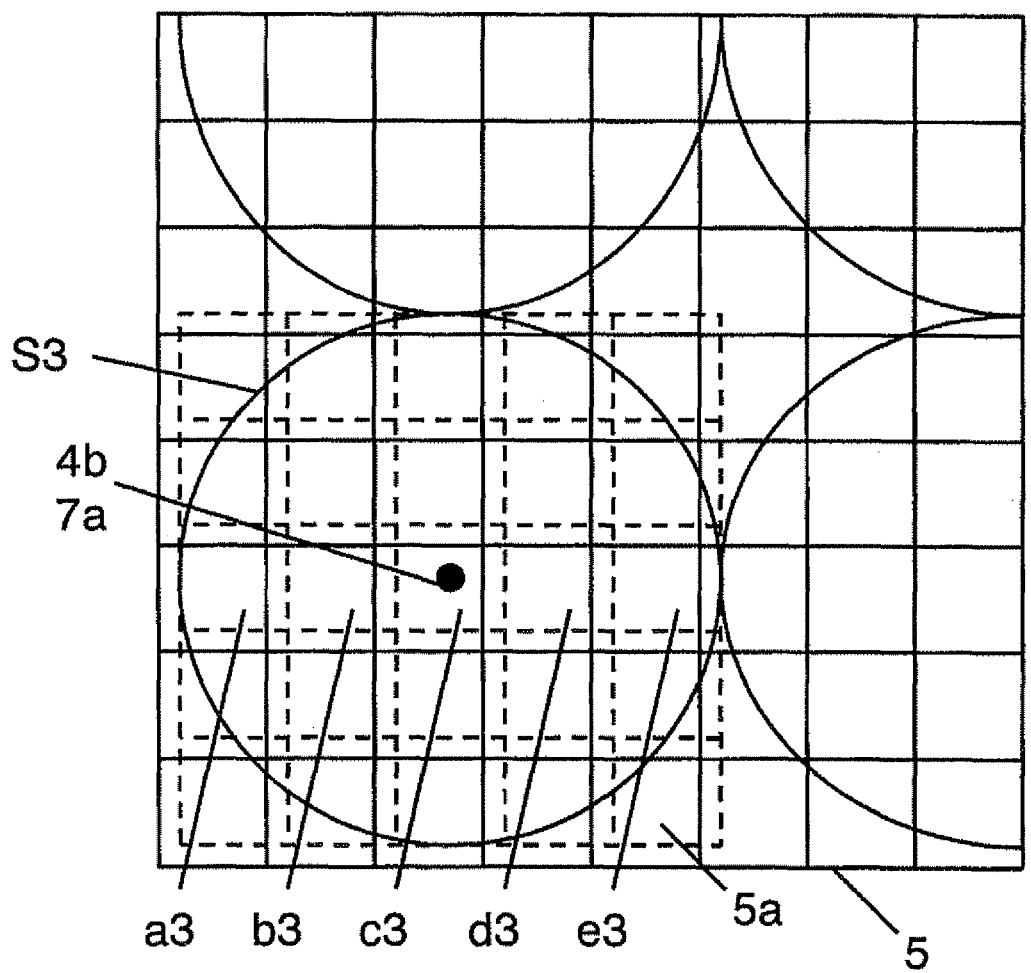
FIG. 12 Figure of a positional relationship that may be assumed for the micro-lenses and the light receiving elements at the area sensor.

FIG. 12 shows the relationship between micro-lenses 4a and light receiving elements 5a at the area sensor 5, in a plan view of a plane ranging perpendicular to the normal lines at the vertices of the micro-lenses 4a, i.e., perpendicular to the optical axes 4b of the micro-lenses 4a. While FIG. 3 shows micro-lenses 4a disposed in a staggered array, FIG. 12 shows micro-lenses 4a arrayed in straight rows for simplification. A circle S2 in FIG. 12 defines the shadow formed as a micro-lens 4a is projected onto the light receiving surface of the area sensor 5 along its optical axis 4b. As explained earlier, the optical axis 4b of the micro-lens 4a is not aligned with the center of a light receiving element 5a at the area sensor 5 and in the example presented in FIG. 12, the optical axis 4b is offset upward to the right along a diagonal direction relative to the center of a light receiving element 5a.

In FIG. 12, normalized light receiving elements 7d selected through the processing described earlier in reference to the optical axis 4b of the micro-lens 4a are each indicated as a rectangular area defined by dotted lines and they assume positions offset upward to the right along a diagonal direction relative to the actual light receiving elements 5a. The outputs of the normalized light receiving elements 7d are calculated as expressed in (10), as are the outputs corresponding to the area 7c in FIG. 7. In the example presented in FIG. 10, image data can be obtained as the sum of the outputs from a total of 25 normalized light receiving elements 7d. In the example presented in FIG. 11, image data can be obtained in a similar manner by taking the sum of the outputs of the normalized light receiving elements 7d corresponding to a plurality of relevant micro-lenses 4a. While a description is given above by assuming that the optical axes 4b of the micro-lenses 4a are designated as the reference positions, the pupil center projection positions 7a may instead be designated as the reference positions.

While an explanation is given in reference to the embodiment on an example in which the present invention is adopted in a digital single lens reflex still camera with an interchangeable lens barrel mounted at the body thereof, the present invention may be adopted in a camera with an integrated lens having a body and an image forming optical system constituted as an integrated unit. In addition, the image forming optical system 1 does not need to be a fixed focal length lens and it may be a zoom lens, the pupil position of which changes in correspondence to the focal length.

While embodiments and variations thereof are described above, the present invention is not limited to these examples and various modifications can be made without departing from the scope of the invention.

The disclosures of the following priority applications are herein incorporated by reference:
Japanese Patent Application No. 2007-258787 filed Oct. 2, 2007
Japanese Patent Application No, 2007-331854 filed Dec. 25, 2007

The invention claimed is:

1. A light receiving device that is configured to receive light having passed through an image forming optical system and is configured to output a light reception signal, the light receiving device comprising:
    a light receiving element array formed by arraying a plurality of light receiving elements;
    a micro-lens array disposed between the image forming optical system and the light receiving element array, the micro lens array including a plurality of micro-lenses arrayed in correspondence to the plurality of light receiving elements; and
    a storage unit that stores position-related information pertaining to a relative positional relationship between the micro-lens array and the light receiving element array with respect to a plane perpendicular to optical axes of the micro-lenses,
    wherein:
    the image forming optical system has a first pupil position, and
    the position-related information indicates a relationship between central positions of pupil images projected via the micro-lenses onto the light receiving element array and the first pupil position.

2. A light receiving device according to claim 1, wherein:
    the image forming optical system further has a second pupil position that is different from the first pupil position, and
    the position-related information further indicates a relationship between central positions of pupil images projected via the micro-lenses onto the light receiving element array and the second pupil position.

3. A light receiving device according to claim 2, wherein:
    the position-related information is constituted with a set of data indicating the first pupil position and the central positions of the pupil images corresponding to the first pupil position.

4. A light receiving device according to claim 2, further comprising:
a position calculation unit that determines, based upon the position-related information, the central positions of pupil images corresponding to a given pupil position that the image forming optical system has.

5. A light receiving device according to claim 4, wherein:
with (x1, y1) and (x2, y2) respectively representing central positions of the pupil images corresponding to the first pupil position h1 and the second pupil position h2 and h0 representing the given pupil position, the position calculation unit calculates a central position (x0, y0) representing each of the central positions of the pupil images corresponding to the given pupil position h0 expressed as;

$$x0=(x2-x1)\{h1 \cdot h2/(h1=h2)\}\cdot(1/h0)+x2-(x2-x1)\{h1 \cdot h2/(h1-h2)\}\cdot(1/h2)$$

$$y0=(y2-y1)\{h1 \cdot h2/(h1-h2)\}\cdot(1/h0)+y2-(y2-y1)\{h1 \cdot h2/(h1-h2)\}\cdot(1/h2).$$

6. A focus detection device, comprising:
a light receiving device that is configured to receive light having passed through an image forming optical system and is configured to output a light reception signal, the light receiving device comprising: (a) a light receiving element array formed by arraying a plurality of light receiving elements; (b) a micro-lens array disposed between the image forming optical system and the light receiving element array, the micro-lens array including a plurality of micro-lenses arrayed in correspondence to the plurality of light receiving elements; and (c) a storage unit that stores position-related information pertaining to a relative positional relationship between the micro-lens array and the light receiving element array with respect to a plane perpendicular to optical axes of the micro-lenses,
a selection unit that selects a group of light receiving elements from a plurality of light receiving elements corresponding to at least some of the plurality of micro-lenses based on a reference position, the reference position being a relative positional relationship, pertaining to a plane perpendicular to the optical axes of the micro-lenses, between the micro-lenses and the light receiving element array, the reference position being determined based upon the position-related information for the at least some of the plurality of micro-lenses; and
a focus detection calculation unit that detects a focusing condition of the image forming optical system based upon outputs from the group of light receiving elements having been selected by the selection unit.

7. A focus detection device according to claim 6, further comprising:
a normalization unit that normalizes, based upon the position-related information, the outputs from the group of light receiving elements having been selected by the selection unit, wherein:
the focus detection calculation unit detects the focusing condition based upon the outputs having been normalized by the normalization unit.

8. A focus detection device according to claim 7, wherein:
the normalization unit normalizes the outputs of the group of light receiving elements having been selected by the selection unit based upon the position-related information through weighted averaging; and the focus detection calculation unit detects the focusing condition of the image forming optical system based upon the outputs having been normalized through the weighted averaging.

9. A focus detection device according to claim 6, wherein:
the group of light receiving elements having been selected by the selection unit includes at least two light receiving elements.

10. A focus detection device according to claim 6, wherein:
the selection unit selects, as the group of light receiving elements, a pair of light receiving element groups centered on the reference position, the reference position being a position of each of the optical axes of the micro-lenses on the light receiving element array.

11. A focus detection device according to claim 10, further comprising:
an ascertaining unit that ascertains a pupil position of the image forming optical system; and
a correction unit that corrects the position of the optical axis based upon the pupil position ascertained by the ascertaining unit.

12. A focus detection device according to claim 9, wherein:
the selection unit selects, as the group of light receiving elements, a pair of light receiving element groups centered on the reference position, the reference position being a central position of an image of a pupil of the image forming optical system, the image of the pupil being projected via each of the micro-lenses onto the light receiving element array.

13. A focus detection device according to claim 10, that repeatedly detects the focusing condition by altering a distance between the pair of light receiving element groups.

14. An imaging device, comprising:
a focus detection device according to claim 6; and
an image sensor that receives a light flux from a subject and outputs an image signal, wherein:
the image forming optical system guides the light flux from the subject to the image sensor and the focus detection device.

15. An imaging device according to claim 14, wherein:
the image forming optical system includes a focusing lens and a lens drive device that drives the focusing lens along an optical axis of the image forming optical system based upon the focusing condition detected by the focus detection device.

16. An imaging device, comprising:
a light receiving device that is configured to receive light having passed through an image forming optical system and is configured to output a light reception signal, the light receiving device comprising: (a) a light receiving element array formed by arraying a plurality of light receiving elements; (b) a micro-lens array disposed between the image forming optical system and the light receiving element array, the micro-lens array including a plurality of micro-lenses arrayed in correspondence to the plurality of light receiving elements; and (c) a storage unit that stores position-related information pertaining to a relative positional relationship between the micro-lens array and the light receiving element array with respect to a plane perpendicular to optical axes of the micro-lenses, and
an image synthesis unit that synthesizes image data expressing an image at a given image plane of the image forming optical system based upon outputs from some light receiving elements selected from the plurality of light receiving elements disposed in correspondence to each of the micro-lenses, the some light receiving elements being selected based on a reference position that is a relative positional relationship, pertaining to a plane perpendicular to the optical axes of the micro-lenses, between the micro-lenses and the light receiving array, the reference position being determined for each micro-lens based upon the position-related information.

17. An imaging device according to claim 16, further comprising:
a normalization unit that normalizes based upon the position-related information the outputs from the some light receiving elements having been selected, wherein:
the image synthesis unit synthesizes the image data based upon the outputs having been normalized by the normalization unit.

* * * * *